United States Patent [19]

DiMurro

[11] Patent Number: 5,538,319
[45] Date of Patent: Jul. 23, 1996

[54] SUN SHADE FOR AN INFANT CAR SEAT

[76] Inventor: Vincent J. DiMurro, 1442 NW. 81 Ter., Plantation, Fla. 33322

[21] Appl. No.: 373,427

[22] Filed: Jan. 17, 1995

[51] Int. Cl.⁶ .............................. A47C 7/66; A47C 29/00
[52] U.S. Cl. ................ 297/184.13; 211/106; 297/184.15
[58] Field of Search ......................... 297/184.13, 184.15

[56] References Cited

U.S. PATENT DOCUMENTS

| | | |
|---|---|---|
| 3,258,291 | 6/1966 | Ezquerra ........................ 297/184.13 X |
| 3,330,575 | 7/1967 | Beudreau ........................ 297/184.13 X |
| 4,293,162 | 10/1981 | Pap et al. . |
| 4,579,385 | 4/1986 | Koenig . |
| 4,583,779 | 4/1986 | Myers ................................ 297/184.13 |
| 4,724,967 | 2/1988 | Valiulis .............................. 211/106 X |
| 4,733,906 | 3/1988 | Davis et al. ....................... 297/184.13 |
| 4,761,032 | 8/1988 | Sanchez et al. ............... 297/184.13 X |
| 4,785,838 | 11/1988 | Negahdari . |
| 4,810,030 | 3/1989 | Lewis . |
| 4,923,249 | 5/1990 | Mattox . |
| 4,978,166 | 12/1990 | James . |
| 5,007,674 | 4/1991 | Franc ................................ 297/184.13 |
| 5,031,783 | 7/1991 | Goudreau ............................ 211/106 X |
| 5,096,257 | 3/1992 | Clark .................................. 297/184.15 |
| 5,205,308 | 4/1993 | Kendall . |
| 5,405,026 | 4/1995 | Lee et al. ............................ 211/106 X |

*Primary Examiner*—Peter M. Cuomo
*Assistant Examiner*—Rodney B. White
*Attorney, Agent, or Firm*—Dale W. Dorinski

[57] ABSTRACT

A sun shade for an infant car seat has a generally U-shaped frame covered by a canopy. The frame extends horizontally forward over the car seat and is removably connected to the rear of the car seat by an attaching portion. The attaching portion rests upon a top edge of the car seat backrest and interfits with a ledge at the rear of the backrest to secure the frame to the car seat in a cantilever fashion. The canopy has a top and at least one side curtain extending downward from a lateral side of the top. In this configuration, the canopy cover serves to completely shield the infant occupant of the car seat from direct rays of sunlight. Optionally, the canopy has an envelope which receives the U-shaped frame structure, and is removable from the frame. An optional second envelope at the rear of the canopy is used to further secure the canopy to the frame and hold the canopy taut.

19 Claims, 3 Drawing Sheets

5,538,319

SUN SHADE FOR AN INFANT CAR SEAT

TECHNICAL FIELD

This invention relates in general to a device for protecting children from the rays of the sun, and more particularly to a sun shade for use with an infant car seat.

BACKGROUND

As is well known in the art, various problems and difficulties have been encountered in providing suitable sun shade devices for protecting infants when they are exposed to the sun, particularly when a baby or young child is placed in a seat designed for use in a motorized vehicle. While it has been thought that when an infant is seated in an infant seat in a vehicle that there was protection offered by the vehicle roof against sun impingement, the fact remains that sunlight passing through the vehicle windows or the vehicle sunroof can shine upon the child, causing skin damage or making the child uncomfortable from the intense light and heat. Since the infant is ordinarily secured in a reclining or near-reclining position, the rays of the sun that come in through the vehicle windows or sunroof will often fall directly upon the baby's face.

Numerous types of sun shades for infants have been proposed in the literature, and some have had commercial success. However, most are not adaptable for use in a vehicle, as they are designed for chairs, strollers, or infant carriers. It is also not practical to place a permanent shading device on an infant car seat because it limits the accessibility of the infant. Of those designed specifically for vehicles, most are visor, parasol or hood devices. Each of these have features that restrict their use, and they are generally complicated to operate or are limited in their ability to provide sunlight protection. Proof of this lies in the lack of commercial success and lack of availability of a suitable sun shade for an infant car seat. None of the prior art devices provide complete protection of the infant from the sun's rays, nor do they provide easy portability from car seat to car seat. Further, they generally require some modification of the car seat (drilling holes, attaching a bracket, fasteners or other securing means); they are generally designed to fit a specific brand or type of car seat; they must be used when the seat is in a particular orientation in the vehicle; and they are not generally usable when the car seat is removed from the vehicle. For example, U.S. Pat. No. 4,293,162 discloses a sun shade that has a bracket that allows adjustment of the canopy. However, the adjustment bracket must be bolted to the car seat, and does not provide easy removal, nor easy transfer to another car seat. Further, it only shields the occupant of the car seat from above, and not from the sides. U.S. Pat. No. 5,205,308 similarly only shields the occupant of the car seat from above, and not from the sides, and the attachment means functions by wedging between the infant car seat and the passenger vehicle seat. As such, it cannot be used outside of the vehicle. Clearly a need exists for an improved device.

SUMMARY OF THE INVENTION

Briefly, according to the invention, there is provided a sun shade for an infant car seat. The sun shade has a generally U-shaped frame covered by a canopy. The frame extends horizontally forward over the car seat and is removably connected to the rear of the car seat by an attaching portion. The attaching portion rests upon a top edge of the car seat backrest and interfits with a ledge at the rear of the backrest to secure the frame to the car seat in a cantilever fashion. The canopy has a top and at least one side curtain extending downward from a lateral side of the top. In this configuration, the canopy cover serves to completely shield the infant occupant of the car set from direct rays of sunlight. In one embodiment of the invention, the canopy has an envelope which receives the U-shaped frame structure, and is removable from the frame. An optional second envelope in the cover is used to secure the cover to the frame.

DETAILED DESCRIPTION OF THE PREFERRED EMBODIMENT

Figure 1:
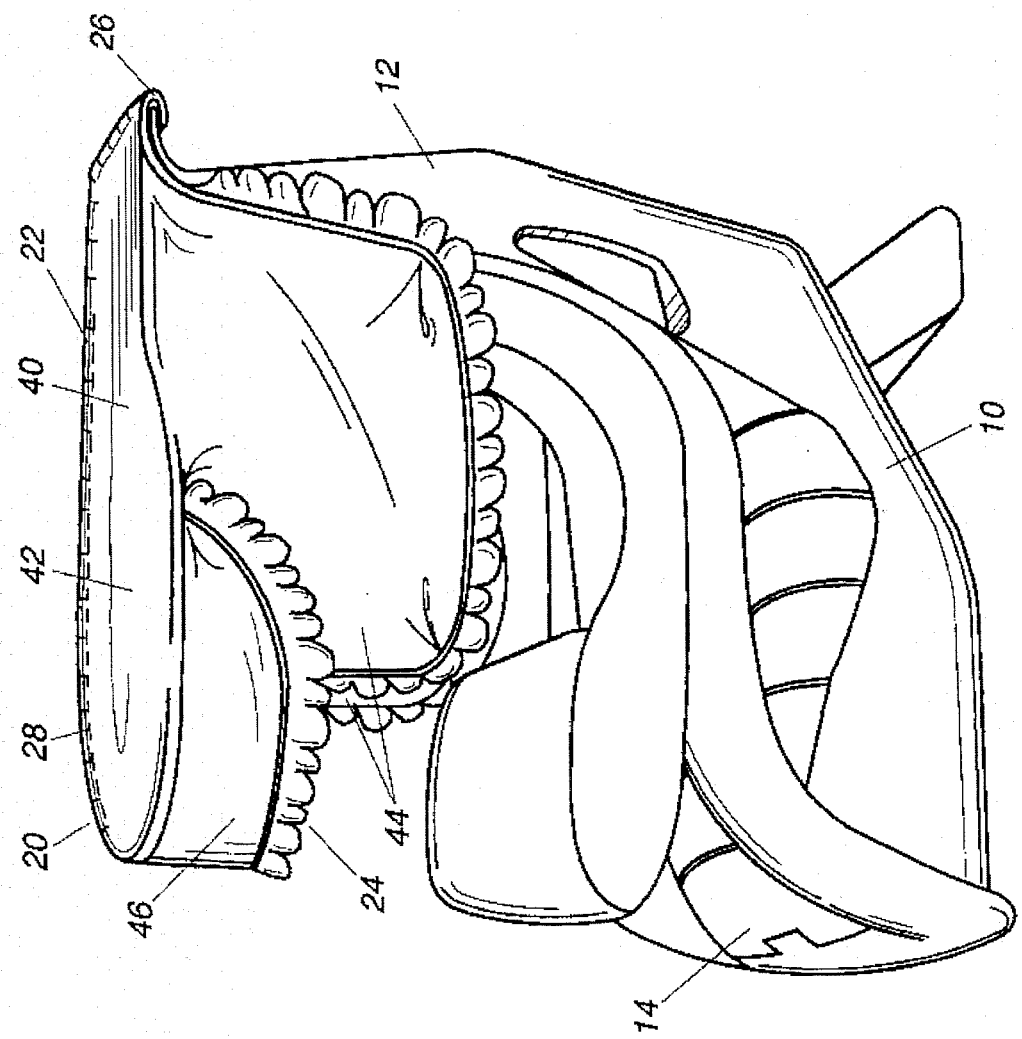
FIG. 1 is a perspective view showing an infant car seat with a sun shade in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an infant's car seat 10 typically has a backrest 12 and a seat portion 14. In normal use, the occupant of the car seat (typically an infant or young child) sits on the seat portion 14 with his back supported by the backrest 12, and is facing forward in the seat. Depending on the age of the occupant and the construction of the individual car seat, the occupant may be seated relatively upright, or may be tilted to rest in a reclining posture. The car seat 10 is typically placed on the vehicle seat, and held in place with the vehicle seat belt. With very small infants, the car seat is typically turned so that the front of the car seat is facing the rear of the vehicle, while with larger infants, the car seat is facing the front of the vehicle. Most modern car seats are made from injection molded plastic, and have generously rounded surfaces and padded cushions as shown in the drawing, to protect the baby.

In accordance with the invention, the sun shade 20 attaches to the rear of the car seat 10 and extends above the seat portion 14 in a generally horizontal manner. In the preferred embodiment, the sun shade is composed of a frame 22 that is covered by a fabric canopy 24. The frame 22 is preferably made from metal rod, although other materials such as metal tubing, plastic rod, or plastic tubing may be substituted. Steel or aluminum are both suitable, if the specific alloy chosen has the requisite stiffness. Those skilled in the art will of course, recognize that the frame may be made with cross sections other than the round one shown in the figures, for example I-beam, box or even irregular cross sections may be used where appropriate to provide the requisite support and stiffness. The frame may optionally be covered with a protective or decorative coating to enhance the appearance and quality of the sun shade. Coatings such as paints, powder coatings, extruded plastic, conversion coatings and anodizing are useful. The frame 22 serves to provide support for the fabric canopy 24 and also serves as the attachment means 26 to connect the sun shade to the car seat. In the preferred embodiment, the frame 22 is a single piece, but has essentially two functional areas. Although manufacturing constraints may dictate that the frame be constructed by assembling several individual pieces into a single unit, the finished frame 22 is considered to be one piece as used in the context of this disclosure and claims. For example, several pieces of steel rod may be bent and formed, then welded together to create the unitary frame. The largest portion is the generally U-shaped portion 28 that forms the perimeter of the top of the sun shade. As shown in the drawing, this portion 28 has a generously rounded front section, but may assume other shapes suitable for the intended design. The portion 28 is a stiff metal rod that provides rigidity to the sun shade and proper support for the fabric canopy. This U-shaped portion 28 extends forwardly over and above the area where the infant sits in the car seat, thereby providing protection to the occupant from impinging sun rays from above.

Figure 2A:
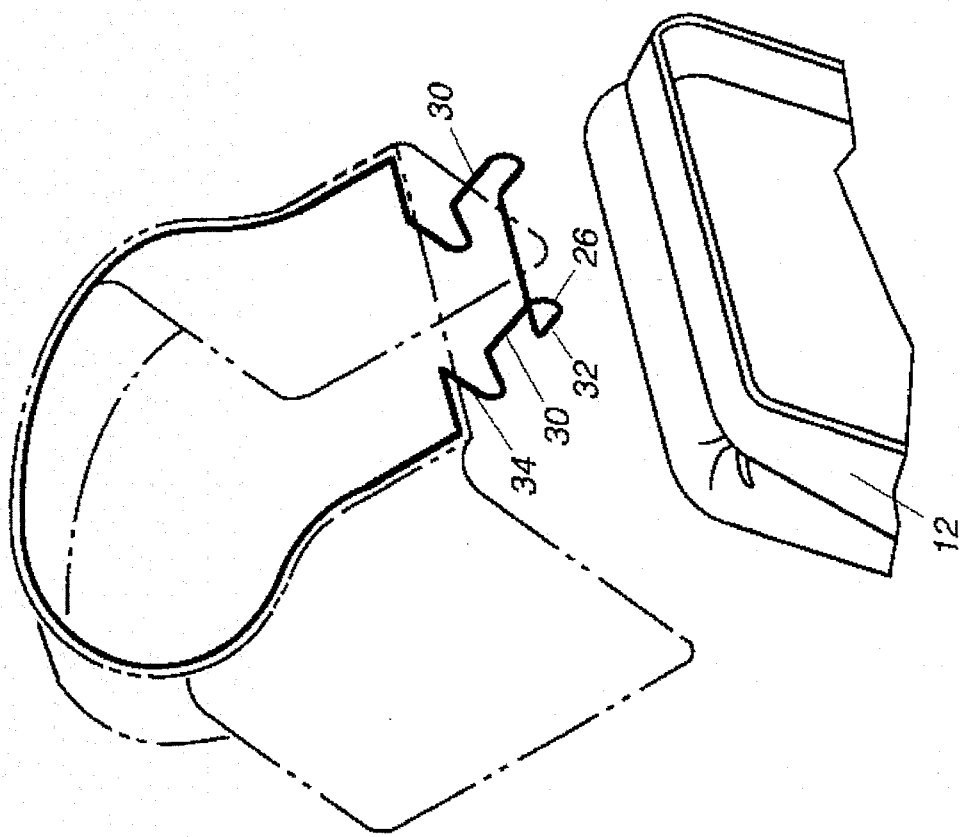
FIG. 2 is a cross sectional view of FIG. 1.
Figure 2:
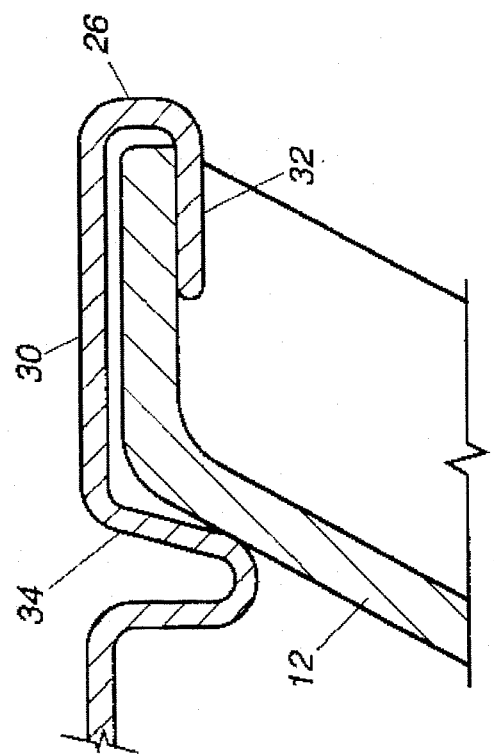
Figure 3:
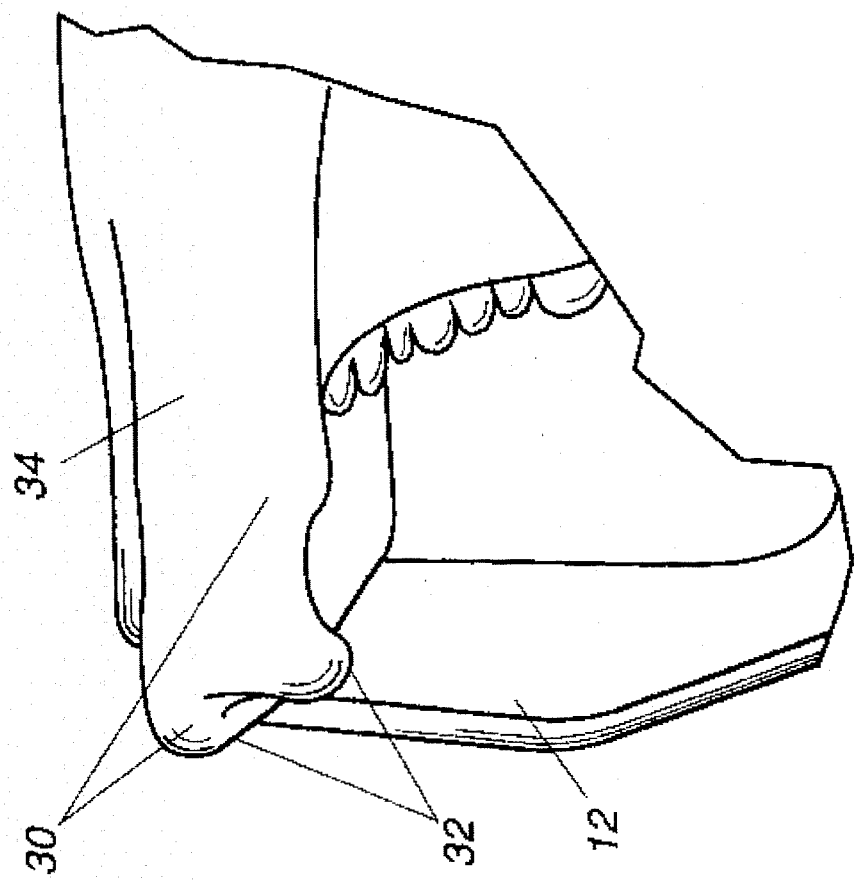
FIG. 3 is a perspective view of the rear of the car seat showing the attaching portion of the sun shade in accordance with the invention.

Referring now to FIGS. 2 and 3, the attachment portion 26 serves to connect the sun shade to the car seat. This portion forms the rear of the frame 22, and is an integral part of the single piece frame. It serves to removably connect the sun shade to the car seat without the use of fasteners or other external support means. This feature distinguishes the instant invention from the prior art, because the prior art requires the use of hooks, wires, brackets, VELCRO® fasteners, screws, or elastic bands. The attachment portion is configured so that the sun shade will fit the many different car seats currently on the market, and so provides a 'universal fit'. The attachment portion 26 consists of a support portion 30, and a retainer portion 32 and a guide portion 34, each serving to aid in coupling the sun shade to the car seat. The support portion 30 extends transversely between the perimeter portion 28 and the guide and retainer portions 32, 34, and rests upon the top edge of the car seat backrest 12 when it is fixed in place, and functions as the fulcrum of the frame 22. In the preferred embodiment, there are two support portions 30, one on each side of the frame, that rest upon both of the top edges of the backrest 12. The retainer portion 32 includes a forwardly facing U-shaped member which serves to engage with a rearwardly facing ledge on the back of the car seat backrest. Most car seats, being made from injection molded plastic, have a ledge or lip on the top of the backrest which was designed to provide stiffness for the backrest. In the preferred embodiment made from metal rod, there are two U-shaped members, one connected to each side of the frame. In other embodiments, it is envisioned that the retainer portion could be a solid channel extending transversely between the two sides of the frame, coupling with the lip on the back of the backrest. This construction would be suitable for situations where the frame is made from, for example, injection molded plastic. The guide portion 34 is interposed between the support portion and the retainer portion 32, and serves to aid in aligning the sun shade to the car seat, and also as a stop shoulder to prevent the frame from traveling rearward and possibly disconnecting the retainer portion 32 from the car seat. This entire configuration allows the sun shade to be suspended over the car seat like a cantilever beam, fixed at one end to the backrest of the car seat.

Referring back to FIG. 1, the canopy 24 covers the frame 22 and is supported by the perimeter portion of the frame. The cover is made from a material that prevents the rays of the sun from impinging on the infant, and is preferably opaque to the sunlight. A synthetic cloth fabric has been found especially suitable for this application, as it can be obtained in an endless variety of patterns and colors, and can be tailored to be attractive to infants and their parents. For example, cartoon characters, angels, football players, teddy bears, animals, etc., may be patterned on the fabric cover.

The canopy 24 has a sleeve or envelope 40 that receives or slides over the perimeter portion of the frame 22 to attach the canopy to the frame. The envelope 40 is part of a top portion 42 of the canopy, which portion is essentially flat when stretched over the frame. Attached to lateral sides of the top portion 42 of the canopy are side curtains 44 which drape downward along the sides of the car seat to block the incident sunlight that would otherwise fall upon the infant. The side curtains may optionally be filled with sheets of flexible foam batting or other materials that would give the side curtains some additional weight and integrity that aids in holding them in position. The additional weight in the side curtains 44 reduces the tendency of unsupported fabric to fly around in breezes generated when the vehicle windows may be open. The side curtains 44 extend downward far enough to completely block any impinging sunlight, which is to say, in most instances they touch the upper edge of the seat portion 14 of the car seat, and extend rearward to the backrest 12. The side curtains 44 are attached to the top portion so that they can be individually folded up to rest upon the top portion to reveal the occupant of the car seat. This feature is useful when, for example, the sun is not coming in from one direction and it is desired to give the infant a view of either the driver or the outside environment. This ability to selectively fold either or both of the side curtains provides flexibility to the user to modify the configuration of the sun shade as the changing environment demands. The side curtains are typically made from the same material as the top portion, but may be different, depending on the desire of the designer. In any case, the side curtains should effectively block the sun's rays from impinging upon the infant occupant. Also attached to the top portion is a front curtain 46 that is attached to the front of the top portion. The front curtain 46 operates in a manner similar to the two side curtains 44, but does not extend down as far as the side curtains do. The front curtain is typically about one-third of the length of the side curtain.

It should now be clear to the reader that the instant invention provides a sun shade that is easy to attach to a car seat, and can also be easily removed. It is completely self supporting and does not require modification of the car seat, nor any additional fasteners, making it easy to transport and move from one car seat to another. Since the sun shade is self supporting, it can also be used on the car seat when the car seat is removed from the vehicle, making it useful for purposes other than transporting the child. The large side curtains provide complete protection to the infant occupant from the sun's rays, while making it easy to modify the configuration of the sun shade as needs and the external environment change.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A removable sun shade for an infant car seat, comprising:
    a frame structure having a generally U-shaped perimeter portion extending horizontally forward over the car seat and an attaching portion for removably coupling the sun shade to a rear portion of the car seat;
    the attaching portion having a support portion to rest upon a top edge of the car seat, and having a retainer portion comprising a guide portion that rests upon and interfits with a forwardly facing portion of the car seat, and having a U-shaped member which open fowardly to closely receive a rearwardly projecting ledge of the car seat, a canopy cover adapted to be supported by the frame structure;

the canopy cover having a top portion and at least one side curtain extending downward from a lateral side of the top portion; and the side curtain serving to completely shield an infant occupant of the car seat from lateral rays of sunlight.

2. The sun shade as described in claim 1, wherein the canopy cover is removably attached to the frame structure.

3. The sun shade as described in claim 2, wherein the top portion of the canopy cover comprises an envelope formed to receive the generally U-shaped perimeter portion of the frame.

4. The sun shade as described in claim 1, wherein the canopy cover further comprises a second side curtain extending downward from a second lateral side of the top portion, and wherein the canopy cover serves to completely shield an infant occupant of the car seat from both overhead and sideward rays of sunlight.

5. The sun shade as described in claim 4, wherein the side curtains are filled with foam batting.

6. The sun shade as described in claim 4, wherein either of the side curtains may be selectively folded about the point of attachment to the top portion to reveal the infant occupant.

7. The sun shade as described in claim 1, wherein the canopy cover further comprises a front curtain extending downward from a front portion of the top portion.

8. The sun shade as described in claim 7, wherein the front curtain may be selectively folded about the point of attachment to the top portion to reveal the infant occupant.

9. The sun shade as described in claim 1, wherein the canopy cover is opaque to sunlight.

10. The sun shade as described in claim 1, wherein the frame structure is self supporting on the car seat, and requires no additional fasteners or support means.

11. The sun shade as described in claim 1, wherein the sun shade may be attached to the car seat when the car seat is not in a vehicle.

12. The sun shade as described in claim 1, wherein the frame structure comprises solid metal rod, solid plastic rod, metal tubing, or plastic tubing.

13. A removable sun shade for an infant car seat, comprising:

an infant car seat having a seat portion and a rear portion, the rear portion having a top edge, a forwardly facing portion, and a rearwardly projecting ledge;

a removable sun shade comprising a canopy cover and a metal rod frame structure, the frame structure having a generally U-shaped perimeter portion extending horizontally forward over the car seat and an attaching portion for removably coupling the sun shade to and interfitting with the rearwardly protecting ledge of the car seat, the attaching portion further comprising:

a support portion to rest upon the top edge of the car seat;

a retainer portion comprising a U-shaped member which opens forwardly to interfit with the rearwardly projecting ledge on the rear portion of the car seat; and a guide portion that rests upon the forwardly facing portion of the rear portion of the car seat;

the canopy cover adapted to completely shield an infant occupant of the car seat from direct lateral rays of sunlight and to be removably attached to the frame structure, and comprising;

a top portion having an envelope formed to receive the generally U-shaped perimeter portion of the frame, and having a front and two lateral sides;

a side curtain extending downward from each lateral side; and a front curtain extending downward from the front; and the frame structure being self supporting on the car seat and requiring no fasteners.

14. The sun shade as described in claim 13, wherein the canopy cover is opaque to sunlight.

15. The sun shade as described in claim 13, wherein either of the side curtains may be selectively folded about the point of attachment to the top portion to reveal the infant occupant.

16. The sun shade as described in claim 13, wherein the front curtain may be selectively folded about the point of attachment to the top portion to reveal the infant occupant.

17. The sun shade as described in claim 13, wherein the side curtains are filled with foam batting.

18. The sun shade as described in claim 13, wherein the sun shade may be attached to the car seat when the seat is not in a car.

19. A sun shade for use with an infant car seat having a seat portion and a rear portion having a top edge, a forwardly facing portion, and a rearwardly projecting ledge, the removable sun shade comprising:

a metal rod frame structure having a generally U-shaped perimeter portion extending horizontally forward over the car seat and an attaching portion for removably coupling the sun shade to the rear portion of the car seat, the attaching portion further comprising:

a support portion to rest upon the top edge of the car seat;

a retainer portion comprising a U-shaped member which opens forwardly to interfit with the rearwardly projecting ledge on the rear portion of the car seat; and a guide portion that rests upon the forwardly facing portion of the car seat;

an opaque fabric canopy cover adapted to completely shield an infant occupant of the car seat from overhead and sideward rays of sunlight and to be removably attached to the frame structure, comprising;

a top portion having an envelope formed to receive the generally U-shaped perimeter portion of the frame, and having a front and two lateral sides;

a side curtain extending downward from each lateral side, a bottom edge of each side curtain substantially touching the upper edge of the seat portion of the car seat, and a rear edge of each side curtain substantially touching the forwardly facing portion of the car seat; and a front curtain extending downward from the front approximately one-third as far as the side curtain extends downward; and the frame structure being self supporting on the car seat and requiring no fasteners.

* * * * *